June 11, 1929.   J. A. WRIGHT   1,716,716
SPRING SUSPENSION
Filed Dec. 7, 1927   2 Sheets-Sheet 1
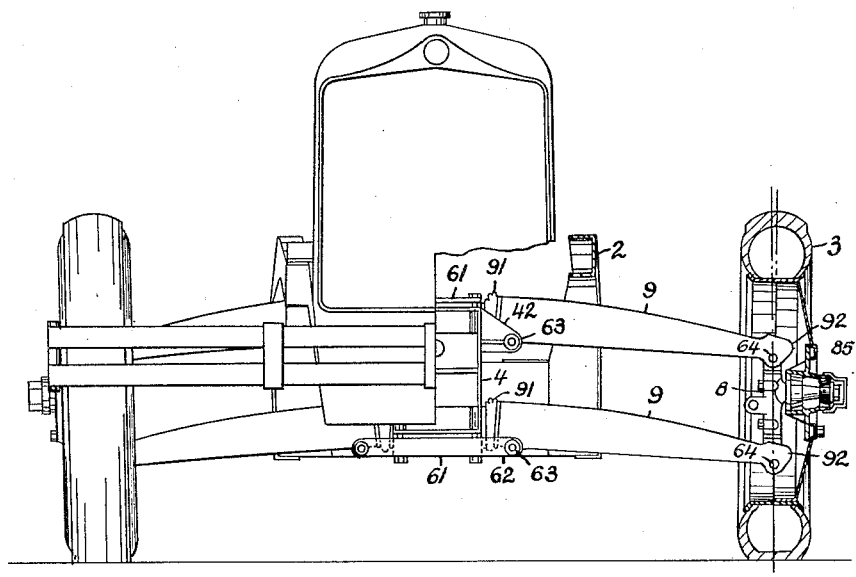
Fig. I.
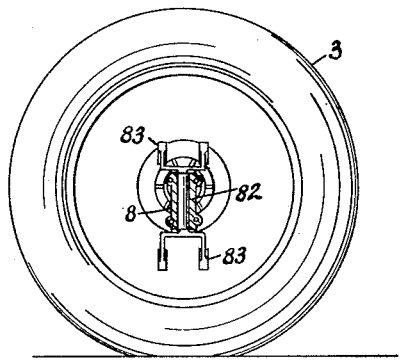
Fig. 2.
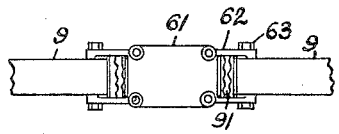
Fig. 3.
Inventor
James A. Wright
By
Attorney

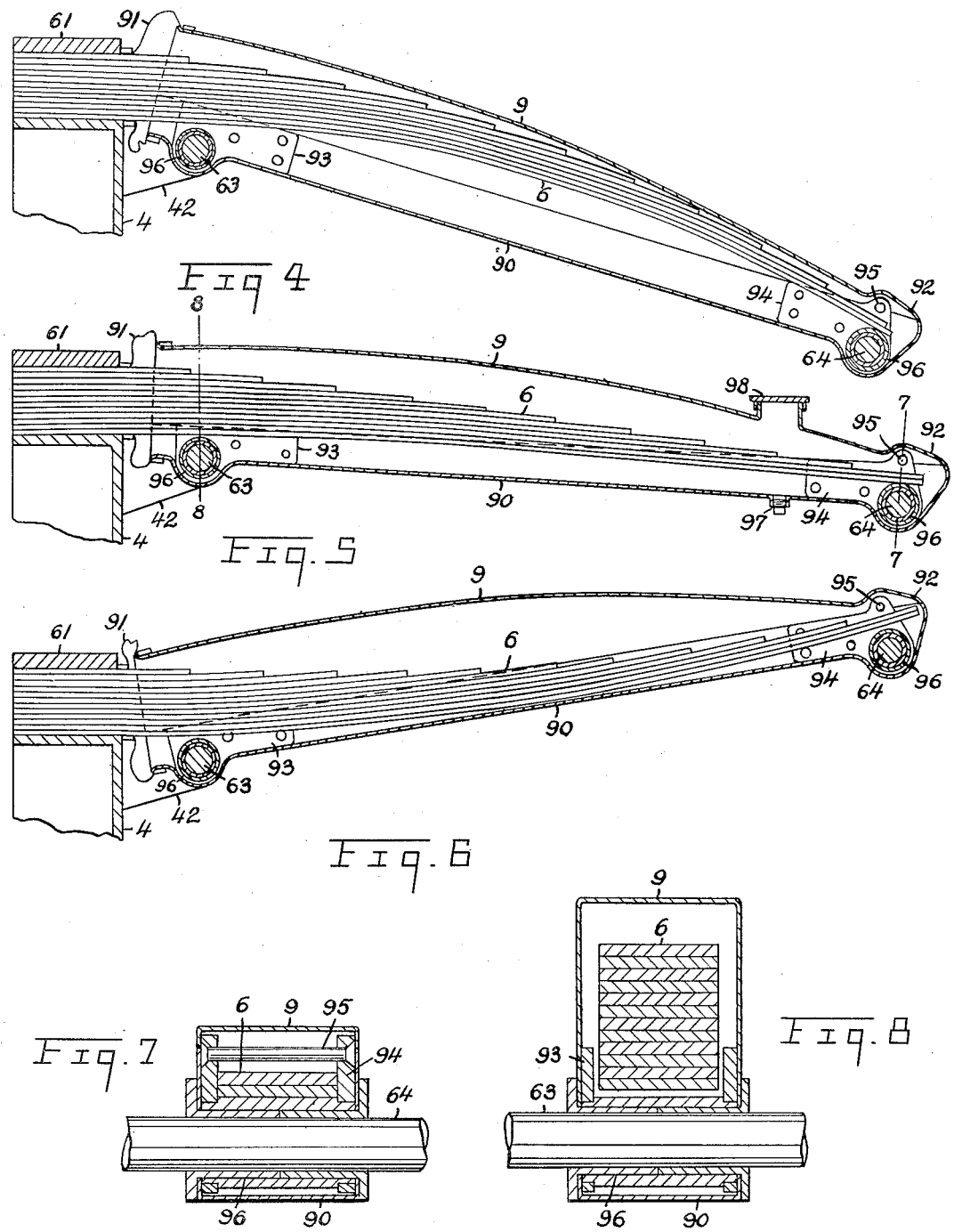

Patented June 11, 1929.

1,716,716

UNITED STATES PATENT OFFICE.

JAMES A. WRIGHT, OF MONTREAL, QUEBEC, CANADA.

SPRING SUSPENSION.

Application filed December 7, 1927. Serial No. 238,401.

This invention relates to motor vehicles, and more particularly to improvements in the spring suspension of the same.

The invention is disclosed as applied to the transverse spring suspension of a front axle assembly in which some form of radius rods are considered advisable, but it is not to be limited to this form of suspension, as it can be readily adapted to the standard forms of spring equipment and produce beneficial results of a valuable character.

The invention consists in replacing the radius rods which are employed with springs, usually of the semi-elliptic type, and spring covers of flexible material, by a rigid sheet metal casing about the spring and pivoted at either end, to function not only as a radius rod but as a cover and oil container as well.

I am aware that gaiters have been employed to encase springs and to provide oil containers, but such devices have been made of non-rigid and flexible material and were not capable of functioning as radius rods and of giving support and increased reliability to the springs.

In this invention however, the casing is constructed to provide rigidity and strength, consisting as it does of two metal channels with their edges welded together to form an enclosing box, strengthened at each end by bearing plates for the pivot pins on which the casing is journalled.

Suitable brackets support these pivot pins, which in the example shown in Figure 1 are at one end brackets to the car frame and at the other end are forks of the wheel carrier.

Reference is made to the accompanying drawings in which:

Figure 1 is a front view of a motor chassis showing the spring mounting with transverse springs encased in radius rod casings.

Figure 2 shows a wheel carrier to which the encased springs are coupled.

Figure 3 is a bottom view of the spring anchorage and the brackets thereto.

Figures 4, 5, and 6 are vertical sectional views of the springs and casings with their end pivots. Figure 5 shows them in normal position, while Figure 4 shows them with the spring under tension, and Figure 6 with the spring under compression.

Figure 7 is a cross section on the line 7—7 of Figure 5.

Figure 8 is a cross section on the line 8—8 of Figure 5.

As shown in Figure 1 the yoke block 4 houses two semi-elliptic springs 6—6, one above and the other below. On each side of the upper spring 6 are brackets 42 extending outwardly from the yoke block 4. The anchor plate 61 which holds the lower spring 6 in its seat, has extensions which provide brackets 62 at each side of the spring 6 as appears in Figure 3.

The wheel carrier 8 with its upper and lower forked bearings 83 and to which the outer ends of the springs 6—6 are coupled, are shown in Figure 2.

The springs 6—6 are encased in rigid casings 9. These casings 9 are made sufficiently large to permit free flexure of the springs 6—6 in either direction.

In the form shown in Figures 4, 5, and 6 these casings comprise upper and lower channels 9, and 90, which are welded together at their edges to form a rigid box or frame of rectangular cross section. The lower channel 90 is reinforced at each end by bearing plates 93 and 94 in which bearings 96 are mounted.

The inner bearing 96 of the upper spring casing between the brackets 42—42 of the yoke block 4 journals the pivot pins 63 and the inner bearing 96 of the lower spring casing between the extension brackets 62 of the anchor plate 61 journals the pin 63. The inner ends of the casings 9 have flexible expanding envelopes 91 which are tightly secured about the springs 6 at one edge and around the ends of the casings at the other edge, and provide flexible closed ends to the casings.

The outer bearings 96 of the casings between the forks 83 of the wheel carrier 8 journal the pins 64.

The outer ends of the springs 6 are shown in sliding contact with the bearings 96 and bolts 95 between upward extensions of the side plates 94 limit the vertical movement of the spring ends and also strengthen the ends of the casings. The casings are preferably enclosed rigidly at their outer ends 92 which are shaped to provide ample space for the free movement of the spring ends.

Inlet openings 96 with caps, and outlet openings 97 with plugs permit a lubricant to be inserted if desired, and to be drained when necessary.

As these casings 9 are pivoted to the chassis frame through the yoke blocks 4 at one end, and to the forks of the wheel carriers 8 at the other end, they perform the functions of radius rods to the springs and maintain the wheel carriers in parallel with the chassis frame during the variations of the spring flexure. Furthermore they prevent any lateral movement or displacement of the springs.

They also provide the springs with a protective cover whereby the springs are maintained free from moisture and dirt. When charged with a lubricant, absence of leakage will keep the exterior surface in condition to be readily cleaned.

By protecting the springs in this manner, breaks in the leaves are not likely to occur, but in the event of a break in one or more of the leaves, the casing will prevent any possibility of collapse and will enable the vehicle to continue without stoppage or delay. This latter feature will be a decided improvement in the safety and comfort of motor vehicles.

By means of slight changes in the construction, casings of this description can be readily adapted to be applied to the standard spring equipment of motor vehicles.

I claim:

1. In a motor vehicle spring suspension, transverse semi-elliptic springs housed in a yoke block secured to the chassis frame and wheels mounted on wheel carriers, with rigid casings about the springs, pivoted to the yoke block and the wheel carriers and adapted to provide radius rods.

2. In a motor vehicle spring suspension, transverse semi-elliptic springs housed in a yoke block secured to the chassis frame, with brackets extending outwardly from the yoke block at each side of the springs, and wheels mounted on wheel carriers having forked bearings above and below, with rigid casings enclosing the springs, pivoted to the brackets and to the forked bearings, and adapted to provide radius rods between the frame and the wheel carriers.

3. In a motor vehicle transverse spring suspension a yoke block secured to the frame, brackets extending from the yoke block, wheels mounted on wheel carriers having upwardly and downwardly projecting forks, rigid casings pivoted to the brackets and to the forks, adapted to provide radius rods, transverse springs securely seated in the yoke block, extending through the casing and having their ends slidingly bearing on the fork pivots of the wheel carrier.

4. In a motor vehicle transverse spring suspension a yoke block secured to the frame, brackets extending from the yoke block, wheels mounted on wheel carriers having upwardly and downwardly projecting forks, rigid casings permanently closed at their outer ends and flexibly enclosed at their inner ends, pivoted to the brackets and to the forks, adapted to provide radius rods, transverse springs securely seated in the yoke block, extending through the casing and having their ends slidingly bearing on the fork pivots of the wheel carrier.

5. A radius rod comprising upper and lower channels rigidly secured together to form a rectangular casing, the lower channel having transverse bearings set in bearing plates at each end, the outer bearing plates having upper extensions connected by a spring retaining bolt, adapted to enclose the springs of a transverse spring suspension.

JAMES A. WRIGHT.